J. F. ROSE.
AUTOMOBILE LOCKING DEVICE.
APPLICATION FILED JAN. 26, 1922.

1,430,325. Patented Sept. 26, 1922.

Inventor
James F. Rose.
By H. E. Dunlap,
Attorney

Patented Sept. 26, 1922.

1,430,325

UNITED STATES PATENT OFFICE.

JAMES F. ROSE, OF BELLAIRE, OHIO, ASSIGNOR OF ONE-HALF TO FRED DEL VECCHIO, OF BELLAIRE, OHIO.

AUTOMOBILE LOCKING DEVICE.

Application filed January 26, 1922. Serial No. 531,887.

*To all whom it may concern:*

Be it known that I, JAMES F. ROSE, a citizen of the United States of America, and resident of Bellaire, county of Belmont and State of Ohio, have invented certain new and useful Improvements in Automobile Locking Devices, of which the following is a specification.

This invention relates broadly to automobile locking devices, and it has for its primary object to provide simple and efficient means whereby an automobile control lever may be locked in a position in which it is inoperative, thereby to protect the automobile against theft or unauthorized operation.

A further object is to provide a device applicable both to cars employing selective gear transmissions and to cars in which transmission gears of planetary type are employed.

With these and other important objects in view, the invention resides in the features of construction, arrangement of parts and combinations of elements which will hereinafter be fully described, reference being had to the accompanying drawings, in which—

Figure 1:
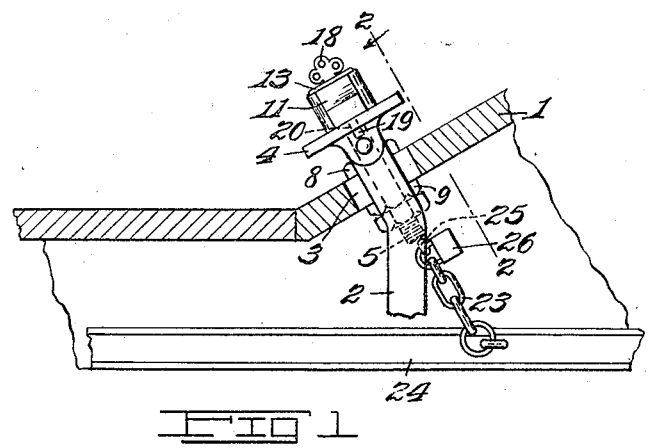
Figure 1 is a front end elevation of the invention applied in locking position to a control lever of an automobile, the floor being shown in section.

Referring to said drawings, 1 indicates an inclined floor-board of an automobile, 2 one of the foot-operated control levers which is movable through an opening 3 in the floor, and 4 the usual foot-pedal carried by such lever. Said lever 2, as herein described, is the clutch control lever of a car equipped with selective type transmission gears.

Extending through the floor board 1 at a suitable point adjacent to the lever-opening 3 is a threaded stem 5 carried by a metal block 6. As herein shown, said block is located intermediate the opening 3 and the adjacent side 7 of the car, but it may obviously be applied above said opening if or when desired. Said stem is adapted for adjustment for positioning said block at any required elevation above the floor board, nuts 8 and 9 being adjustable thereon into firmly seated relation to the upper and under sides of said board.

Pivotally attached to one end of the block 6, as to an upstanding lug 10 formed on the latter, is the bifurcated tail-piece 11ª of a bar 11 which is adapted to be swung to and from overlying seated relation to the upper face of said block 6, in which position, when the lever 2 occupies its depressed clutch releasing position, the outer end of said bar rests upon the top face of the pedal 4.

Figures 3, 4:
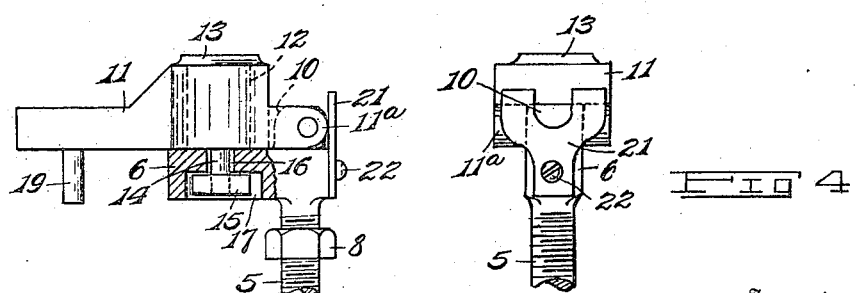
Figure 3 is an enlarged side elevation of the locking members with parts shown in section; and—
Figure 4 is a rear end elevation of the same.

Rigidly mounted in a socket 12 provided therefor in the body portion of said bar is a key-operated lock 13 of a cylinder or barrel type which has a rotary lock-bolt or stem 14 projecting downward therefrom and carrying a transverse oblong head 15 on its lower end. In one position of said lock-bolt 14, the head 15 is freely movable through an oblong slot 16 into a relatively large socket 17 provided in the under side of the block 6. In another position of said lock-bolt 14, assumed through rotation of the key 18 throughout a quarter revolution, said head 15 crosses said slot 16, as shown in Fig. 3, thereby effectually preventing elevation of the bar 11.

A pin 19 carried on the under side of the bar 11 is designed to pass through a hole 20 provided therefor in the clutch pedal 4, thereby to prevent the device from being swung laterally from pedal-overlying position, as by blows struck upon the side of said bar.

Figure 2:
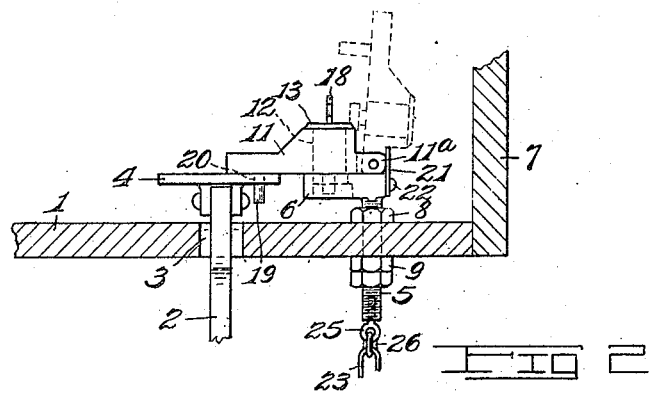
Figure 2 is a sectional elevation with the section taken on line 2—2, Fig. 1.

When the bar 11 is elevated to permit unobstructed operation of the clutch lever, the same is swung back to substantially the position shown in dotted lines in Fig. 2, where it will remain out of the way. Suitable means may be provided for holding said bar in said position against a tendency to fall over in either direction. Illustrative of such means, a spring 21 is shown in the drawings, the same consisting of a flat vertically disposed plate having its lower end rigidly attached to the rear end of the block 6, as by means of a screw 22. The upper end of said plate is forked and has the forks thereof resting firmly against the ends of the tail-piece 11ª with their upper ends projecting somewhat above said tail-piece. In the elevated and slightly outwardly inclined position of the bar shown in dotted lines in Fig.

2, the upper edges of the forks have seated thereon the rear end of the body portion of the bar, supporting the latter against further outward swinging movement and yieldingly resisting forward swinging movement.

To prevent unauthorized detachment of the stem 5 from the floor board 1, and also to prevent said floor board with the attached locking mechanism from being bodily raised to a level at which the clutch lever is rendered operative, a suitable anchoring device is attached to said stem 5. Said device comprises an anchor chain 23 having its lower end permanently attached to any suitable stationary part of the automobile, as to the chassis frame 24. The lower end of the stem 5 has therein a threaded socket into which is screwed an eye-bolt 25. The upper end of the chain 23 is attached to said eye-bolt by means of a padlock 26.

While the locking mechanism has been described herein as associated with the clutch control lever of an automobile, it will be obvious that it may be associated with the gear shift lever of cars employing planetary type transmission, in which case it will serve to lock such lever in reverse gear position.

What is claimed is—

1. A lock for a pedal-carrying control lever of an automobile, comprising a member having a depending threaded stem mounted in a floor board adjacent to said lever with the lower end thereof located beneath said floor board, means for anchoring said stem against elevation, a locking bar pivotally carried by said member and adapted for vertical swinging movement to and from a position in which an end portion thereof occupies overlying seated relation to the pedal of the control lever when the latter is depressed, and rotary key-operated means whereby said locking bar is locked in said seated position in interengaged relation with said member.

2. A lock for a pedal-carrying control lever of an automobile, comprising a member having a depending threaded stem mounted in a floor board adjacent to said lever with the lower end thereof located beneath said floor board, means for securing said stem in floor-board anchoring position, a locking bar pivotally carried by said member and adapted to be swung vertically to and from a position in which the outer end portion thereof occupies overlying seated relation to the pedal of the control lever when the latter is depressed, said locking bar when so seated having its body portion also overlying said stem-carried member, a lock-bolt rotatably carried by said locking bar and having an oblong head on its lower end, said member having an opening therein for the reception of said bolt-head, and key-operated means for rotating said lock-bolt to a position wherein said bolt-head underlies a portion of said member for locking said bar in its said seated position.

In testimony whereof, I affix my signature in presence of two subscribing witnesses.

JAMES F. ROSE.

Witnesses:
 H. E. DUNLAP,
 CHAS. P. SCHLICK.